UNITED STATES PATENT OFFICE.

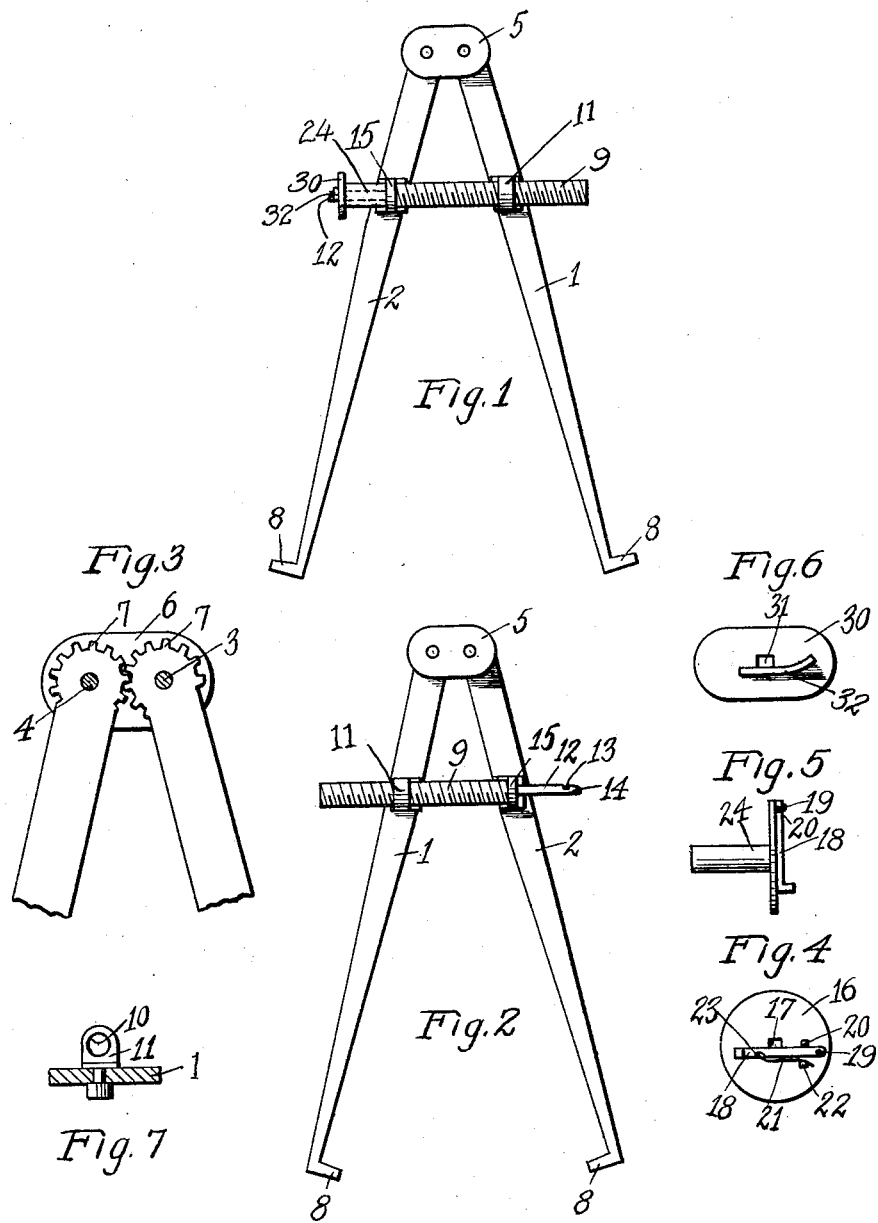

GEORGE B. FENNO, OF SMITHVILLE FLATS, NEW YORK, ASSIGNOR OF ONE-HALF TO CLAUDE ADAMS, OF SMITHVILLE FLATS, NEW YORK.

REVERSIBLE CALIPERS.

1,109,056.  Specification of Letters Patent.  Patented Sept. 1, 1914.

Application filed April 21, 1913. Serial No. 762,677.

*To all whom it may concern:*

Be it known that I, GEORGE B. FENNO, a citizen of the United States, residing at Smithville Flats, in the county of Chenango and State of New York, have invented certain new and useful Improvements in Reversible Calipers; and I do hereby declare the following to be a full, clear, and exact description of the invention, such as will enable others skilled in the art to which it appertains to make and use the same.

This invention relates broadly to measuring instruments and has particular reference to that type of such devices known as screw calipers.

The principal object of this invention contemplates the provision of calipers in which the legs of the instrument may be swung to bring those edges which are normally the outer edges into opposing relation, and in this manner transform the instrument from a device for measuring inside diameters to an instrument for measuring outside diameters.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a plan view illustrating the caliper legs in their assembled relation when employed in measuring inside diameters; Fig. 2 is a similar view illustrating the assembled relation of the caliper legs when employed in measuring outside diameters; Fig. 3 is a detail view of the co-acting racks formed on the pivoted terminals of the caliper legs; Fig. 4 is a top plan view of the preferred form of locking disk employed in connection with the adjusting screw; Fig. 5 is a side elevation of the locking disk illustrated in Fig. 4; Fig. 6 is a detail view of the modified form of the locking disk; and Fig. 7 is a detail view illustrating in section the pivotal ears employed in securing the adjusting screw to the caliper legs.

Proceeding now to the description of the drawings, the numerals 1 and 2 designate the legs of the instrument. These members 1 and 2 are pivoted at their upper terminals, as at 3 and 4, between a pair of head plates 5 and 6 in the customary manner. On the pivoted terminal of each of the members 1 and 2 are formed toothed racks 7, which interengage each other in the usual manner, and act to transmit a corresponding movement from one leg to another when one of them is swung on its pivot during the adjustment of the legs. Each of the measuring legs 1 and 2 carries at its lower terminal a laterally extending pintle 8. When the caliper is utilized in measuring inside diameters, the legs 1 and 2 are disposed in such relation to each other that the pintles 8 extend outwardly from the members 1 and 2. When the caliper is employed in measuring outside diameters, however, the legs 1 and 2 are swung to bring the legs 1 and 2 into a position of inward projection from their respective legs as illustrated in Fig. 2.

As a means for adjusting the distance between the measuring terminals of the two legs 1 and 2, and for permitting the legs to be readily swung from one position to another, as above described, this invention employs an adjusting screw 9 adjustably mounted within an opening 10 formed in a pivoted supporting ear 11, which is mounted upon the leg 1, as illustrated in detail in Fig. 7. One terminal of the screw 9 is reduced to provide a finger 12. The finger 12 is provided with a notch 13 adjacent its free terminal and is beveled as at 14, to facilitate the application of the disk lock to be hereinafter described. In assembling the adjusting screw 9, the finger 12 is projected through an opening formed in the ear 15, similar in construction to the ear 11 and pivotally secured to the leg 2, until the threaded portion of the screw 9 is in engagement with the inner face of the ear 15, and the disk lock of this invention is then applied. The preferred embodiment of this disk lock includes a metallic disk 16 formed with a square central opening 17, through which the finger 12 is projected. The disk 16 carries a latch member 18, which may be formed of a strip of resilient metal. The member 18 is pivotally secured to the member 16, as at 19, and is limited in its movement toward the opening 17 by a stop lug 20 secured to the disk 16. The member 18 is designed to normally close a portion of the opening 17 and, as a means for holding the latch in this position, this invention employs a leaf spring 21 secured to the disk by a pin 22 and arranged with its free end seated in the notch formed in the member 18, as indicated at 23.

From the foregoing it will be apparent that when the disk 16 is applied to the finger 12 the beveled terminal 14 of the finger will engage the latch 18, swinging it on its pivot, and that as the tubular projection 24 carried on the inner face of the disk 16 engages the adjacent face of the ear 15 the latch 18 will be forced by the spring 21 downwardly into the notch 13 of the finger 12, thus holding the screw 9 in the desired position. The member 9 may then be manipulated in the customary manner to adjust the legs on the material.

The modified form of disk lock employed in this invention is illustrated in Fig. 6. In this form the lock includes a disk 30 provided with a square central opening 31, and carrying the leaf spring 32 secured to the disk in any desired manner, and arranged to normally close a portion of the opening 31. The application of this modified form of disk lock is similar to that above described to the member 16, it being apparent that as the disk is slipped on the member 12 the member 32 will drop into the notch 13, thus holding the member 9 in the desired position by retaining the finger 12 against withdrawal and holding the terminal of the threaded portion of the member 9 against the ear 15. In this connection it is to be observed that the lock disks of this invention are designed for the performance of two functions, for they act at once to hold the caliper screw in the desired assembled relation on the legs 1 and 2, and to afford an operating handle for adjusting the caliper screw. This latter function is produced by reason of the fact that the disks are each provided with a square opening which is of sufficient size to permit the disk to be mounted on the square finger 12, but is not large enough to permit the rotation of the disk on the finger.

From the foregoing it will be seen that when the caliper legs are to be swung from the position in which they are assembled to measure inside diameters, to the position in which they operate to measure outside diameters, as illustrated in Figs. 1 and 2, respectively, it is only necessary to remove the disk lock and to separate the legs 1 and 2, thus removing the finger 12 from the ear 5. After the legs have been swung from the position indicated in Fig. 1 into that indicated in Fig. 2, it is only necessary to insert the finger 12 through the ear 15 and to apply the disk lock in the manner above described.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. A caliper including a head member, a pair of reversible legs pivotally secured thereto, a perforate ear pivoted on one of said legs, an adjusting screw threaded through said ear, a perforate ear pivoted on the other leg, an integral finger formed on one terminal of said screw, and operating through said second ear, and a detachable disk lock adapted to be mounted on said finger for holding said finger against withdrawal from said ear.

2. A caliper including a head member, a pair of reversible legs pivotally secured thereto, a perforate ear pivotally attached to one of said legs, an adjusting screw threaded through and adjustable in said ear, an integral finger formed on one terminal of said screw, a perforate ear pivoted on the other leg, and adapted to receive said finger, and a detachable disk lock for holding said finger against withdrawal from said ear.

3. A caliper including a head member, a pair of reversible legs pivotally secured thereto, a pair of perforate ears pivoted on each of said legs, an adjusting screw threaded through and adjustable in one of said ears, an integral finger formed on one terminal of said adjusting screw and operating through the perforation of the other ear, and unitary means for manipulating said adjusting screw and holding said finger against withdrawal from said last named ear.

4. A caliper including a head member, a pair of reversible legs pivotally secured thereto, a perforate ear for each of said leg members, an adjusting screw threaded through and adjustable in one of said ears, an integral notched finger formed terminally of said screw and extending longitudinally thereof, the other ear being adapted to receive said finger, and unitary means for holding said finger against withdrawal from said last named ear, and for manipulating said adjusting screw, said means including a disk member having a central opening, and a spring pressed latch member pivoted on said disk and adapted to engage the notch of said finger when in assembled position.

5. A caliper including a head member, a pair of leg members pivotally secured thereto, an adjusting screw, an ear pivotally mounted on each of said leg members, and adapted to receive said screw, a lock disk for said screw for manipulating said screw and holding it against withdrawal from said ears, said lock disk including a body member having a central opening, a latch member pivoted to said body member, a leaf spring secured to said body member and bearing against said latch member.

In testimony whereof I affix my signature in presence of two witnesses.

GEORGE B. FENNO.

Witnesses:
CARL E. READ,
CLAUDE A. ADAMS.